(12) United States Patent
Menceloglu et al.

(10) Patent No.: US 10,106,460 B2
(45) Date of Patent: Oct. 23, 2018

(54) ADDITIVE FOR SUSPENSIONS

(71) Applicant: SABANCI ÜNIVERSITESI, Istanbul (TR)

(72) Inventors: Yusuf Menceloglu, Istanbul (TR); Omid Akhlaghi, Istanbul (TR); Özge Akbulut, Istanbul (TR)

(73) Assignee: SABANCI ÜNIVERSITESI, Istanbul (TR)

( * ) Notice: Subject to any disclaimer, the term of this patent is extended or adjusted under 35 U.S.C. 154(b) by 322 days.

(21) Appl. No.: 15/044,065

(22) Filed: Feb. 15, 2016

(65) Prior Publication Data
US 2016/0236982 A1   Aug. 18, 2016

(30) Foreign Application Priority Data
Feb. 16, 2015 (EP) ................................ 15155210

(51) Int. Cl.
| | |
|---|---|
| *C08F 220/16* | (2006.01) |
| *C08F 220/58* | (2006.01) |
| *C04B 24/26* | (2006.01) |
| *C04B 24/16* | (2006.01) |
| *C08F 220/06* | (2006.01) |
| *C08F 222/16* | (2006.01) |
| *C08F 230/02* | (2006.01) |
| *C04B 28/02* | (2006.01) |
| *C04B 103/32* | (2006.01) |

(52) U.S. Cl.
CPC ........ *C04B 24/2694* (2013.01); *C04B 24/165* (2013.01); *C04B 24/2647* (2013.01); *C04B 28/02* (2013.01); *C08F 220/06* (2013.01); *C08F 220/58* (2013.01); *C08F 222/16* (2013.01); *C08F 230/02* (2013.01); *C04B 2103/32* (2013.01); *C08F 2220/585* (2013.01)

(58) Field of Classification Search
CPC . C08F 2220/585; C08F 230/02; C08F 220/58
See application file for complete search history.

(56) References Cited

U.S. PATENT DOCUMENTS

| | | | | |
|---|---|---|---|---|
| 5,534,157 A | * | 7/1996 | Iman ......................... | C02F 5/14 162/30.1 |
| 5,565,106 A | * | 10/1996 | Sherbondy ................ | C02F 5/14 210/700 |
| 2013/0231415 A1 | | 9/2013 | Page et al. | |

FOREIGN PATENT DOCUMENTS

| | | | |
|---|---|---|---|
| CN | 102268121 A | | 12/2011 |
| CN | 102358768 A | | 2/2012 |
| CN | 102617063 A | | 8/2012 |
| CN | 102815882 A | | 12/2012 |
| CN | 103436873 A | * | 12/2013 |
| DE | 19647030 A1 | * | 5/1998 ........... C11D 3/1273 |

OTHER PUBLICATIONS

Machine translation of CN-103436873-A (Year: 2013).*
Machine translation of DE-19647030-A1 (Year: 1998).*
Yangqiao Liu, Lian Gao, "Dispersion of aqueous alumina suspensions using copolymers with synergistic functional groups", Materials Chemistry and Physics 82 (2003) 362-369.
R.G. Neves, B. Ferrari, A.J. Sanchez-Herencia, C. Pagnoux, E. Gordo, "Role of stabilisers in the design of Ti aqueous suspensions for pressure slip casting", Powder Technol 263 (2014) 81-88.
Yangqiao Liu, Lian Gao, "Deflocculation study of aqueous nanosized Y-TZP suspensions", Materials Chemistry and Physics 78 (2002) 480-485.
Chunxia Xiao,Lei Gao,Mingjing Lu,Han Chen,Lucun Guo,Lianbin Tao,"Synergistic effect of copolymer and poly(vinylpyrrolidone) mixtures on rheology of aqueous SiC suspension", Colloids and Surfaces A: Physicochemical and Engineering Aspects 355 (2010) 104-108.
Tung-Sheng Liao, Chao-Lung Hwang, Yi-Shian Ye, Kung-Chung Hsu, "Effects of a carboxylic acid/sulfonic acid copolymer on the material properties of cementitious materials", Cement and Concrete Research 36 (2006) 650-655.
H. Bouhamed, S. Boufi, A. Magin,"Alumina interaction with AMPS—MPEG copolymers produced by RAF polymerization: Stability and rheological behavior", Journal of Colloid and Interface Science 333 (2009) 209-220.
Catherine P. Whitby, Peter J. Scales, Franz Grieser, Thomas W. Healy ,Glen Kirby, Jennifer A. Lewis, and Charles F. Zukoski, "PAA/PEO comb polymer effects on rheological properties and interparticle forces in aqueous silica suspensions", Journal of Colloid and Interface Science 262 (2003) 274-281.
H. Bouhamed, S. Boufi, A. Magin,"Alumina interaction with AMPS—MPEG random copolymers III.Effect of PEG segment length on adsorption,electrokinetic and rheological behavior", Journal of Colloid and Interface Science 298 (2006) 238-247.

* cited by examiner

*Primary Examiner* — Wenwen Cai
(74) *Attorney, Agent, or Firm* — Gokalp Bayramoglu

(57) ABSTRACT

The present invention proposes a polycarboxylate ether-based additive having the general formula (I) for use as flow modifier in suspensions. The present invention further proposes a method for obtainment of such additive, wherein the method comprises the sequential steps of esterification of polyethylene glycol (PEG) with maleic anhydride (MA) and thus obtainment of a chemical product (PEGMA); and free radical polymerization in a mixture comprising acrylic acid (AA), 2-acrylamido-2 methylpropanesulfonic acid (AMPS) and PEGMA as reactants, further comprising water and an initiator, initial pH value of said mixture is within the range between 7.5 and 8.5, and any free oxygen is removed from the mixture throughout the free radical polymerization.

19 Claims, 1 Drawing Sheet

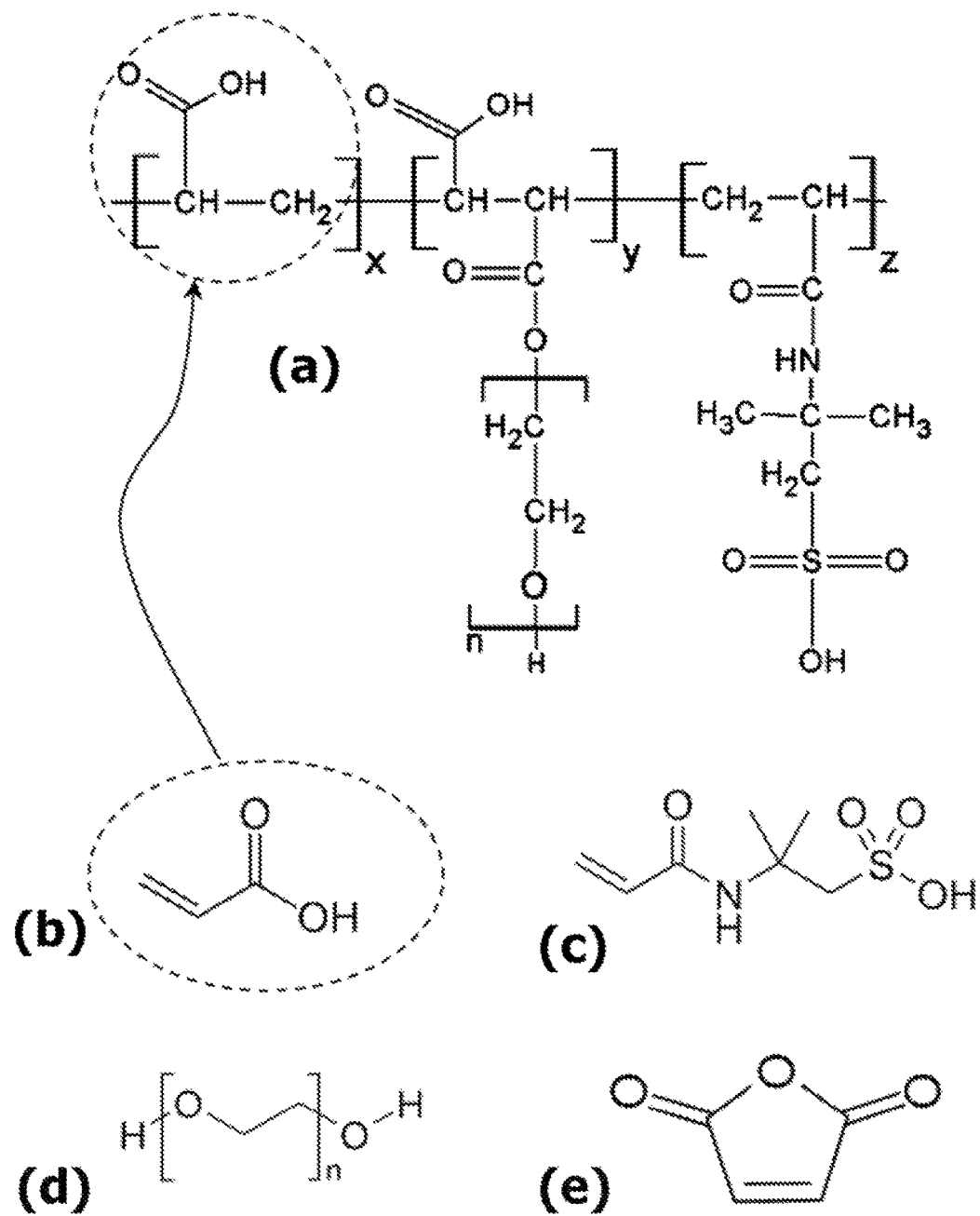

ADDITIVE FOR SUSPENSIONS

TECHNICAL FIELD OF THE INVENTION

The present invention relates to an additive for suspensions, and a preparation method thereof.

BACKGROUND OF THE INVENTION

The generally preferred solvent in ceramic powder processing is water since its burden on process economy and environment is lower than its alternatives. Obtainment of stable aqueous dispersions of colloidal ceramic particles is important for several industrial processes including casting, ink-jet printing and spray drying. For obtaining sinterable and crack-free ceramic compacts suspensions, high solid contents (>40 vol %) are required, since stability is an important issue. Yet, particle aggregation usually results in complex rheological behavior at concentrated colloidal systems. Provision of dispersion stability requires repulsive electrostatic forces predominating over Van der Waals forces, and dispersants are added to ceramic suspensions with high solid content for imparting electrical charge on ceramic particles thereon. Dispersants affect rheological properties of suspensions by decreasing viscosity and agglomeration of the suspensions and homogenization of the final microstructure. The amount of dispersants in such mixtures need to be designated cautiously, since excess amounts of dispersants lead to bridging flocculation whereas inadequate amounts reduce the absolute value of zeta potential.

Polyacrylic acid (PAA) is widely used in many systems (Y. L. Ciao, Materials Chemistry and Physics 82 (2003) 362; R. G. Neves, B. Ferrari. A. J. Sanchez-Herencia, C. Pagnous, E. Gordo, Powder Technol 263 (2014) 81; Y. Liu, L. Gao, Materials Chemistry and Physics 78 (2003) 480) such as dispersion of Ti, $Al_2O_3$, and yttria stabilized zirconia in aqueous media; but performance of PAA is limited due to its simple structure. On the other hand, linear copolymers of PAA, depending on the types of synergistic functional groups, can provide various properties such as wider pH range for high absolute zeta potential value, lower optimum dosage of dispersant (Y. Liu, L. Gao, Materials Chemistry and Physics 78 (2003) 480; C. Xiao, L. Gao, M. Lu, H. Chen, L. Guo, L. Tao, Colloids and Surfaces A: Physicochemical and Engineering Aspects 355 (2010) 104 T. S. Liao, C. L. Hwang, Y. S. Ye, K. C. Hsu, Cement Concrete Res 36 (2006) 650), and less sensitivity to flocculation in the presence of excess amount of dispersant. The stabilizing effect of linear polymers can be improved by addition of side chains in order to harness steric hindrance effect as well. These amphipathic structures are usually composed of long hydrophilic side chains grafted to a backbone. The backbone bears ionizable groups such that they can anchor to the surface of particles while side chains protrude into the medium and produce steric hindrance effect (H. Bouhamed, S Boufi, A. Magnin, Journal of colloid and interface science 333 (2009) 209; C. P. Whitby, P. J. Scales, F. Grieser, T. W. Healy, G. Kirby, J. A. Lewis, C. F. Zukoski, Journal of colloid and interface science 262 (2003) 274; H. Bouhamed, A. Magnin, S. Boufi, Journal of colloid and interface science 298 (2006) 238).

Likewise, maintenance and adjustment of flow characteristics of aqueous concrete mixtures by restraining segregation of dense particles is an important issue attracting research interest worldwide. To increase workability of concrete by adjusting flow characteristics, aqueous solutions of superplasticizers are added to concrete mixtures. The strength of hardened concrete is inversely proportional to water content of the concrete mixture. Superplasticizers are used as an additive to lower the water to cement ratio (w/c) of concrete mixtures while keeping required fluidity to make high performance concrete. Sulfonated melamine formaldehyde, sulfonated naphthalene formaldehyde and modified lignosulfonates are among conventional superplasticizers. These conventional superplasticizers reduce amount of water needed for workable cementitious mixtures but their ability to retain slump flow over time is limited.

New generation superplasticizers named polycarboxylate ether-based superplasticizers (PCE) are composed of long hydrophilic polyethylene glycol (PEG) side chains grafted to a backbone. The backbone provides ionizable groups to get adsorbed effectively onto surfaces of hydrating cement particles and PEG side chains provide steric hindrance effect in pore solutions. According to the US patent document US 2013 231 415 A1, the former provides initial fluidity and the latter provides workability retention of the superplasticizer. Dispersing ability of a PCE is known to be dominated by steric hindrance effect of the side chains while adsorption to surface of the cement particles is dependent on anionic charge density of the backbone.

One of the most important parameters that affect the adsorption of PCE on cement particles is the existence of high concentration of sulfate ions in the pore solution of the cement paste. In this solution, sulfate ions compete with the ionized backbone of PCE to attach to the surface of cement particles, such that the amount of adsorption of PCE is lowered. In addition, condensation of PEG side chains might occur and lead to a reduction in the steric hindrance effect. Partial substitution of carboxyl by trialkoxysilane group increases the adsorption of PCE to the cement particles; and also addition of a cyclic lactone block to the backbone (i.e. main chain) increases anionic charge of PCE.

Chinese patent document CN 102 358 768 A used an aqueous solution of allyl methyl polyethylene glycol at the beginning of the process and solution of acrylic acid and 2-acrylamido-2-methylpropane sulfonic acid (AMPS) monomers are added dropwise to the reaction medium. Monomer mixture is heated to 50~90° C. under purge of nitrogen and the process is followed by addition of initiator, ammonium, sodium or potassium persulfate, and chain transfer agent mercapto or mercaptoacetic acid, to the medium dropwise for 1-3 hours. At the end of the polymerization process, reaction medium is cooled to 25~50° C. and pH is adjusted to 5.0~7.5.

Chinese patent document CN 102 268 121 A used aqueous solution of 2-methyl-allyl polyethylene glycol (TPEG), AMPS and methacrylic acid with 20% to 50% concentration as the reaction medium and ammonium persulfate as the initator. Reactor is heated up 60~100° C. and nitrogen gas is purged throughout the reaction. Monomer and initiator solution are added dropwise to the reactor which is containing deionizer water and equipped with condenser. Then, the reaction continued for another 1-2 hours followed by cooling to room temperature and neutralizing by sodium hydroxide to reach pH of 6-8.

Chinese patent document CN 102 617 063 A used pH-adjusted aqueous solution of allyl polyethylene glycol, maleic anhydride, acrylic acid and AMPS as reaction media, hydrogen peroxide as the initiator and a transition metal salt as a catalyst to improve the polymerization activity of maleic acid. Polymerization is initiated in the pH range of 2.5-6.0 and after completion of the reaction; pH of the medium is adjusted to 6-7 with solution of 30% sodium hydroxide.

Patent document US 2013 0231 415 A1 used aqueous solution of different monomers such as unsaturated carboxylic acid monomer, ethyleneglycol methacrylate phosphate ester and ethylenic-unsaturated monomer containing straight or branched chain alkyl groups or $(C_nH_{2n}O)_mH$. The monomer mixture, the initiator and the chain transfer agent solution are added gradually into the reactor that is fitted with a thermometer and a cooling condenser. After completion of the process, the polymer is neutralized with sodium hydroxide.

In a typical polymerization disclosed by the Chinese patent document CN 102 815 882 A, a reactor is equipped by a stirrer, thermometer, reflux condenser and nitrogen gas purge. After addition of certain amount of deionized water to the reactor and heating to 50° C., solution of unsaturated carboxylic acid and reducing agent are added gradually. After increasing of the temperature to 60-80° C., solution of methyl vinyl ether, polyoxyethylene alkylene and maleic anhydride are added to the reaction gradually and then solution of methyl allyl sulfonate and oxidizing agent are added to the system separately. Reaction continues for 3 hours at 85° C. and after cooling to 45° C., it is neutralized with 32% sodium hydroxide solution.

Various approaches have been developed to improve the performance of PCE with respect to water reduction, slump flow, sulfate sensitivity and cement compatibility. Using allyl ether, polyethylene glycol esterified by acrylic acid, maleic anhydride and other unsaturated monomer at free-radical copolymerization in an aqueous solution resulted in a broad molecular weight distribution of a polymeric superplasticizer. Difficulty in controlling the molecular weight causes performance drop of a superplasticizer. Using a redox initiator system, a catalyst to enhance the reactivity of monomers and a chain transfer agent to control polydispersity of a superplasticizer, the complexity of the synthesis process is increased and also the compatibility of the process to industrial design and production is decreased, it is not surprising that industry is still looking for high performance and cost effective products which have a simple production method.

OBJECTS OF THE INVENTION

Primary object of the present invention is to overcome the abovementioned shortcomings of the prior art.

Another object of the present invention is obtainment of an additive which provides high slump retention and sulfate resistivity to dispersions of ordinary Portland cement.

Another object of present invention is obtainment of an additive which enables incorporation of high solid content in ceramic suspensions while maintaining workability of such suspensions.

Yet another object of the present invention is to provide a simple, cost-effective and environmentally friendly production method of such additive.

SUMMARY OF THE INVENTION

The present invention proposes a polycarboxylate ether-based additive for suspensions, said additive having the general formula (I) for use as flow modifier in suspensions. The present invention further proposes a method for obtainment of a such additive for use in suspensions, wherein the method comprises the sequential steps of esterification of polyethylene glycol (PEG) with maleic anhydride (MA) and thus obtainment of a chemical product (PEGMA); and free radical polymerization in a mixture comprising acrylic acid (AA), 2-acrylamido-2 methylpropanesulfonic acid (AMPS) and PEGMA as reactants, further comprising water and an initiator, initial pH value of said mixture is within the range between 7.5 and 8.5, and any free oxygen is removed from the mixture throughout the free radical polymerization.

BRIEF DESCRIPTION OF THE FIGURE

The FIGURE, whose brief explanation is herewith provided, is solely intended for providing a better understanding of the present invention and is as such not intended to define the scope of protection or the context in which said scope is to be interpreted in the absence of the description.

FIG. 1 shows chemical formulas of (a) the PCE according to the present invention, (b) acrylic acid, (c) 2-acrylamido-2-methylpropanesulfonic acid, (d) poly ethylene glycol, and (e) maleic anhydride.

DETAILED DESCRIPTION OF THE INVENTION

Referring now the FIGURE outlined before, the present invention proposes an additive providing high slump retention and sulfate resistivity, and a preparation method thereof.

Preparation and characterization of a PCE-based grafted copolymer comprising acrylic acid (AA), AMPS, and PEG-1000 are performed. The change in reaction conditions and feed ratio to investigate their effect on the slump flow and the compressive strength of the hardened cement paste is studied. It is found that the addition of said modified and optimized copolymer even at small amounts such as 0.1% by weight of cement (bwoc) changes the value of zeta potential of particles in the cement paste from about 0 mV to about −25 mV, thus imparting repulsion between the particles. This repulsion increases the workability and slump retention of cement paste. It is also shown that said copolymer remains effective in medium with high concentration of sulfate ions that compete with the adsorption of PCE to the cement particles.

The present invention provides a high performance modified PCE having the general formula (I) (shown in FIG. 1(a)) that includes acrylic acid (chemical formula of which is shown in FIG. 1(b)), 2-acrylamido-2-methylpropanesulfonic acid (AMPS) (chemical formula of which is shown in FIG. 1(c)), poly ethylene glycol (PEG) (chemical formula of which is shown in FIG. 1(d)), and maleic anhydride (MA) (chemical formula of which is shown in FIG. 1(e)). In formula (I), x is an integer value between 25 and 75, y is an integer value between 1 and 3, z is an integer value between 25 and 75, and n is an integer value between 23 and 46.

A mixture preferably comprising at least 90% (w/w) polycarboxylate ether-based additive (PCE) according to the above definition with respect to the total weight of said mixture can also be called as additive according to the present invention.

The inventors observed that said values of x, y, z and n correspond to favorable molecular weights of the PCE according to the present invention to result in higher slump retention and sulfate resistivity in comparison with the superplasticizers of the state of the art (commercially available superplasticizers).

The present invention further proposes a method for obtainment of polycarboxylate ether-based additive for use in suspensions, wherein the method comprises the sequential steps of:

a) Esterification of polyethylene glycol (PEG) with maleic anhydride (MA) and thus obtainment of a chemical product (PEGMA);
b) Free radical polymerization in a mixture comprising acrylic acid (AA), 2-acrylamido-2 methylpropanesulfonic acid (AMPS) and PEGMA as reactants, said mixture further comprising water and an initiator; said mixture having an initial pH value within the range between 7.5 and 8.5; and any free oxygen is removed from the mixture throughout the free radical polymerization.

In a preferred embodiment of the method according to the present invention, the step (b) comprises following sequential steps.

c) stirring upon preparation of a mixture comprising water, acrylic acid (AA), 2-acrylamido-2 methylpropanesulfonic acid (AMPS) and PEGMA for a first time interval ranging between 25 and 35 minutes, along with removal of free oxygen from the mixture,
d) controlled addition of a first portion of initiator into the reactor, and raising the reactor temperature to a range between 48 and 53° C. and maintaining the reactor temperature within said range for a second time interval ranging between 45 and 55 minutes,
e) controlled addition of a second portion of initiator into the reactor, raising the reactor temperature to a range between 55 and 65° C. and maintaining, the reactor temperature within said range for a third time interval ranging between 65 and 90 minutes,
f) raising the reactor temperature to a range between 75 and 90° C. and maintaining the reactor temperature within said range for a fourth time interval ranging between 210 and 300 minutes.

More preferably, the initial pH value is within the range between 7.8 and 8.2, since as explained above, most favorable polycarboxylate ether-based additive is obtained with the initial pH value within said range.

Preferably, the PEG in the step (a) is PEG-1000 for obtaining a favorable dispersing ability as explained below.

The esterification in the step (a) is preferably performed with equimolar initial amounts of PEG and MA.

In a preferred embodiment according to the method of the present invention, the esterification in the step (a) is preferably performed for 100 to 130 minutes and with a reactor temperature within the range of 85 to 95° C.

The total reactants content in the mixture of step (b) is preferably between 10 to 20% w/w, and more preferably between 12 to 18% w/w.

Preferably, the mixture of step (b) initially comprises 23 to 28 moles of AA and 22 to 27 moles of AMPS per each mol of PEGMA.

Preferably, the initiator comprises potassium persulfate (KPS), having a mass concentration within the range 0.5% to 1.5% w/w with regard to the mass of the monomers in the mixture.

In a preferred embodiment of the method according to the present invention, the controlled addition of the initiator in at least one of step (d) and step (e) is performed throughout a time interval within the range between 4 and 8 minutes, and more preferably within the range between 4.5 and 6 minutes.

For achieving a highly favorable molecular weight in the polycarboxylate ether-based additive obtained with the method according to the present invention, preferably, the first time interval ranges between 28 and 32 minutes, the second time interval ranges between 47 and 52 minutes, the third time interval ranges between 70 and 80 minutes, and the fourth time interval ranges between 225 and 260 minutes.

Preferably, the removal of free oxygen is performed by sweeping with an inert gas, preferably with nitrogen.

An exemplary lab-scale obtainment of PCE according to the method of the present invention is described below in detail. By giving said example, it is solely intended to provide a better understanding of the present invention and is as such not intended to limit the scope of the appended claims.

EXAMPLE

Materials:
Acrylic acid (AA, 99%), 2-acrylamido-2 methylpropanesulfonic acid (AMPS, 99%), potassium persulfate (KPS, ≥99.0%), hydrochloric acid (HCl, 37%), deuterium oxide are obtained from Sigma Aldrich; and PEG-1000, maleic anhydride (MA, 99%) sodium hydroxide (NaOH, ≥97%), sodium sulfate are obtained from Merck. All of the reagents were used as received without further purification. Ordinary Portland cement (OPC) commercially available under the model name CEM 1 42.5 R (AKçANSA, Turkey) was used for preparation of all cement mixtures.

Synthesis of PCE-Based Copolymer

The esterification of PEG-1000 by MA is carried out according to the procedure that was proposed in literature (S. H. Lu, G. Liu, Y. F. Ma, F. Li, J. Appl, Polym. Sci. 117 (2010) 273-280.). PEG-1000 is preferred for esterification based on higher dispersing ability of AMPS/PEG-1100 copolymer than AMPS/PEG-2000 instead of higher molecular weight PEGs such as PEG-4000, thus esterification thereof with MA resulting in a PEG diester is avoided. Equimolar amounts of PEG-1000 and MA were charged into a 250 ml three neck flask and then heated up to 90° C. The reaction medium was kept under nitrogen for 2 hours; then, cooled to room temperature. The reaction product which is hereafter referred as PEGMA was used for polymerization without any purification.

Different AA/AMPS/PEGMA copolymers are synthesized according to a method described by Salami and Plank (O. T. Salami, Johann Plank, J. Appl. Polym. Sci 126 (2012) 1449-1460). For a typical aqueous free radical polymerization, aqueous solutions with 15% w/w total reactants content wherein the molar ratios of different reactants are shown in Table 1, were prepared in 110 ml deionized water. The preferable total reactants content in the aqueous mixture thereof is between 10 to 20% yaw, and more preferably between 12 to 18% w/w with respect to the total weight of said aqueous mixture.

As detailedly explained below, the best results (best flow performance) is obtained by using PCE6 produced with initial AA/AMPS/PEGMA molar ratios 25/25/1. Thus, the inventors have decided that most favorable initial AA/AMPS/PEGMA molar ratios within the reaction mixture of the method according to the present invention are such that the initial reaction mixture comprises 23 to 28 moles of AA and 22 to 27 moles of AMPS per each mol of PEGMA.

Subsequently, pH of these mixtures was adjusted to values shown in Table 1, by using aqueous solutions of NaOH and HCl. Then each mixture was charged into a reactor (which was a three neck flask that is connected to a reflux condenser). Nitrogen was used for removal of free oxygen throughout the reaction. After 30 min, the reactor was heated up to 50° C. and a first portion of initiator (10 mL aqueous solution of 0.25 g KPS) was dropwise added to the reaction chamber (said addition continued for 5 minutes). Thus, the solution contained 1% w/w KPS compared to the total mass of monomers (i.e. reactants). This concentration of KPS is chosen, since higher concentrations such as 2-4% w/w KPS in earlier trials resulted in low molecular weight polymers as products, and these products did not have any favorable effect on cement flowability.

The initiator used in the example is an aqueous solution of potassium persulfate (KPS), yet it is worth noting that the scope of the present invention is not limited to KPS, and any free radical polymerization initiator which potentially produce comparable results (i.e. which initiates the reaction for production of polycarboxylate ether-based additive from the reactants) must still be considered within the scope of the present invention. Thus, preferably, the initiator comprises an inorganic peroxide selected from the list consisting of $(NH_4)_2S_2O_8$ (ammonium persulfate), $HOCH_2SO_2Na.2H_2O$ (hydroxymethanesulfinic acid monosodium salt dihydrate), $K_2S_2O_8$ (potassium persulfate), $NA_2S_2O_8$ (sodium persulfate), or a mixture thereof.

50 minutes later than the abovementioned addition of KPS, the reactor temperature was raised to 60° C. and a second portion of initiator (10 ml aqueous solution of 0.25 g KPS) was added to the reaction medium, and the reaction temperature was maintained for another 75 minutes. Then, temperature was increased to 80° C. and the reaction continued for another 4 hours (240 minutes). It is observed that only oligomers instead of polymers can be obtained when this duration is significantly shorter than 4 hours, e.g. in 3 hours. Therefore the inventors decided that acceptable extent of conversion into polymers with desired molecular weights requires said duration to be longer than 3.5 hours (210 minutes), and preferably longer than 3.75 hours.

Finally, the reactor was cooled down to room temperature. The product was precipitated in acetone, and dried under vacuum at 50° C. until the product reached a constant weight.

TABLE 1

Molar ratios of starting materials (AA, AMPS and PEGMA) for polymerization reactions described in Example 1.

| Polymer ID. | pH | Molar ratio AA/AMPS/PEGMA |
|---|---|---|
| PCE1 | 6 | 75/75/1 |
| PCE2 | 6 | 25/25/1 |
| PCE3 | 6 | 15/15/1 |
| PCE4 | 8 | 40/10/1 |
| PCE5 | 8 | 30/20/1 |
| PCE6 | 8 | 25/25/1 |
| PCE7 | 8 | 20/30/1 |
| PCE8 | 8 | 10/40/1 |
| PCE9 | 13 | 25/25/1 |
| AA/AMPS copolymer | 6 | 1/1/0 |

Preparation of Cement Paste:

Each of the PCE was added into cement mixtures to observe their effect on flowability of respective samples. The samples are stirred using a Heidolph RZR 2102 mixer equipped with a 4-blade stainless steel propeller. Different amounts of polymers were first dissolved in water and then certain amounts of cement (OPC) powder were charged into these polymer solutions for preparation of mixtures with water to cement ratio (w/c) within the range between 0.45 and 0.4. Each cement paste was stirred at 200 rpm for 2 minutes and after resting for 30 sec, further stirred for 5 minutes at 1500 rpm. Some of said mixtures were sealed to prevent water evaporation and slump retention tests were carried out in the intervals of 30, 60, and 120 minutes after mixing. For increasing sulfate ions concentrations in specific samples, different amounts of sodium sulfate was dissolved in said polymer solutions before mixing them with cement powder.

Among several products obtained according to the above example, the most favorable performance was observed for the modified PCE synthesized at pH 8 with an AA/AMPS/MGMA molar ratio of 25/25/1, which corresponds to the sample named PCE6 on Table 1).

The modified PCE according to the present invention exhibits higher fluidity and slump retention compared to commercially available PCEs and maintains its performance even in media with high concentration of sulfate ions. Thus, the behavior of the modified PCE according to the present invention is more favorable than commercially available PCEs in terms of workability, slump retention and sulfate resistivity.

An evaluation of additive (PCE) according to the present invention was carried out on ordinary Portland cement (OPC) type 1. Each sample was mixed using a Heidolph RZR 2102 mixer equipped with a 4-blade stainless steel propeller. First, different amounts of said PCE were mixed in water and then each of these mixtures was charged into a certain amount of OPC powder, such that cement pastes with 0.45 w/w water to cement ratio were obtained. Sulfate ions concentration in certain samples was adjusted by addition of 200 mmol/L sodium sulfate into the mixtures, prior to preparation of respective cement pastes. Each cement paste was stirred at 200 rpm for 2 minutes and after resting for 30 seconds, the cement pastes were further stirred for another 5 minutes at 1500 rpm; and then a mini slump test was performed according to ASTM C143. The cement pastes were sealed in order to prevent the evaporation of water, and slump tests were carried out for intervals of 30, 60 and 120 minutes after stirring. Before each slump test, the cement pastes were stirred again for 30 seconds. The mini-slump flow diameters of the cement pastes were compared with two ordinary cement samples prepared using commercially available additives referred as Competitor 1 and Competitor 2. The Table 2 presents the comparative results for cement pastes having PCE/cement weight ratio of 0.001.

The cement paste (i.e. native OPC) used in the experiments reportedly contains 26 $mmol \cdot L^{-1}$ of sulfate ions. Column 1 to Column 4 show the mini-slump flow diameters (mm) represented as $D_5$, $D_{30}$, $D_{60}$ and $D_{120}$, respectively, after 5, 30, 60 and 120 minutes from addition of respective PCEs indicated on Column 1; wherein no additional sulfate ions are added into respective samples. In the last column (Column 5) of the Table 2, $D_{5, SO4}$ represents the mini-slump-flow diameter (mm) after 5 minutes for each product, wherein the sulfate ions concentration in the product samples is raised to 200 mmol $L^{-1}$. Checking Column 5 against Column 1 provides a comparative aspect with regard to the effect of high concentration sulfate ions on flow behavior of a cement paste. Note that the test results show a decrease on the slump flow diameter (i.e. a decrease in flowability) under high sulfate concentrations.

TABLE 2

Mini-slump flow diameter test results of cement pastes (mm)

| | Column 1 | Column 2 | Column 3 | Column 4 | Column 5 |
|---|---|---|---|---|---|
| Additive | $D_5$ (mm) | $D_{30}$ (mm) | $D_{60}$ (mm) | $D_{120}$ (mm) | $D_{5, SO4}$ (mm) |
| Competitor 1 | 103 | 90 | 83 | 65 | 97 |

TABLE 2-continued

Mini-slump flow diameter test results of cement pastes (mm)

|  | Column 1 | Column 2 | Column 3 | Column 4 | Column 5 |
|---|---|---|---|---|---|
| Competitor 2 | 113 | 94 | 86 | 63 | 99 |
| PCE6 | 118 | 108 | 100 | 73 | 105 |

The pH level of the product is preferably between 7 and 8, as best performance (i.e. highest flowability values) is observed at cement pastes comprising PCE6 as additive (here: as superplasticizer).

The present invention discloses a simple method for synthesis of high performance PCE Without requiring any chain transfer agent or complex initiator system, molecular weight of the additive is controlled by pre-adjustment of pH level of the polymerization medium. Since the pH level of the desired final product is between 7 and 8, neutralizing step at the end of the process is eliminated. Initial reaction medium contains all the monomers, thus gradual addition of monomers throughout the reaction is eliminated. Furthermore, addition of the initiator is facilitated by limiting to two parts; at the beginning and in the middle of the reaction, instead of gradual or dropwise addition throughout the reaction as performed in the prior art. As described above, with the production method according to the present invention, the desired products are obtained in a short reaction time and with simplified procedures. Thus, the method according to the present invention is simple, and cost-effective. Furthermore, the method according to the present invention can be considered as environmentally friendly.

Stability and extensional flow behavior investigations for alumina suspensions were performed in presence of additives according to the present invention. Again, the performance was evaluated based on the monomer feed ratio and molecular weight of copolymers. Particle size analysis and rheological measurements confirmed the stabilizing effect of PCE. Rheological measurements indicated that the introduction of PCE into 35 vol % alumina suspension reduces the extensional viscosity and strain hardening behavior. Electrokinetic studies showed that using the optimized PCE results in all-negative zeta potentials for the entire pH range (i.e. pH values ranging from 2 to 12) even at 0.5 wt % addition and at 1 wt % the suspension did not display a strain hardening behavior. We believe this type of additive will be also useful in applications requiring suspensions with high solid content, e.g. inkjet printing and spraying.

Thus the following objects are achieved by the present invention:
overcoming the abovementioned shortcomings of the prior art,
provision of
an additive providing high slump retention and sulfate resistivity to dispersions of ordinary Portland cement,
provision of an additive enabling incorporation of high solid content in ceramic suspensions while maintaining workability of such suspensions,
a simple, cost-effective and environmentally friendly production method of such additive.

The invention claimed is:
1. A polycarboxylate ether-based additive (PCE) having the general formula (I) for use in suspensions,

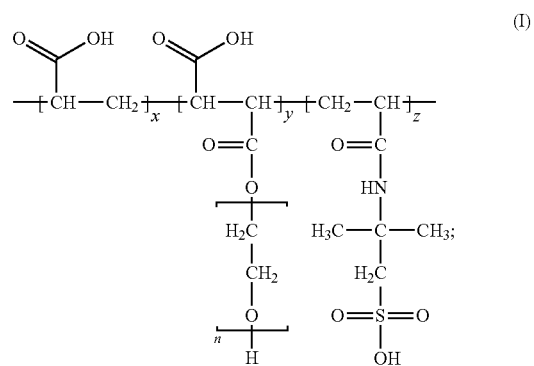

wherein x is an integer value between 25 and 75, y is an integer value between 1 and 3, z is an integer value between 25 and 75, and n is an integer value between 23 and 46.

2. A mixture comprising the polycarboxylate ether-based additive according to the claim 1.

3. A method for obtainment of a polycarboxylate ether-based additive for use in suspensions, wherein the method comprises the sequential steps of:
   a) Esterification of polyethylene glycol (PEG) with maleic anhydride (MA) and thus obtainment of a chemical product (PEGMA);
   b) Free radical polymerization of a mixture comprising acrylic acid (AA), 2-acrylamido-2 methylpropanesulfonic acid (AMPS) and PEGMA as reactants, said mixture further comprising water and an initiator; said mixture having an initial pH value within the range between 7.5 and 8.5; and any free oxygen is removed from the mixture throughout the free radical polymerization;
   wherein the polycarboxylate ether-based additive (PCE) has the general formula (I)

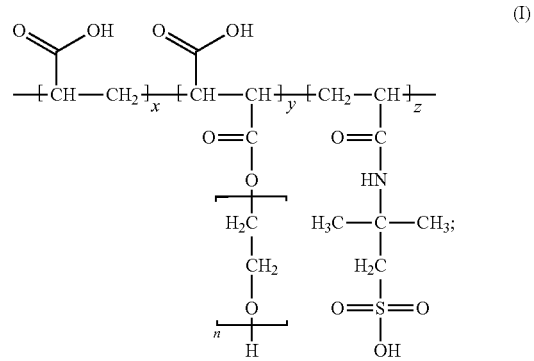

wherein x is an integer value between 25 and 75, y is an integer value between 1 and 3, z is an integer value between 25 and 75, and n is an integer value between 23 and 46.

4. The method according to the claim 3, wherein the step (b) comprises following sequential steps:
   c) stirring upon preparation of a mixture in a reactor comprising water, acrylic acid (AA), 2-acrylamido-2 methylpropanesulfonic acid (AMPS) and PEGMA for a first time interval ranging between 25 and 35 minutes, along with removal of free oxygen from the mixture,
   d) controlled addition of a first portion of initiator into the reactor, and raising the reactor temperature to a range between 48 and 53° C. and maintaining the reactor temperature within said range for a second time interval ranging between 45 and 55 minutes, e) controlled addition of a second portion of initiator into the reactor, raising the reactor temperature to a range between 55 and 65° C. and maintaining the reactor temperature within said range for a third time interval ranging between 65 and 90 minutes, f) raising the reactor temperature to a range between 75 and 90° C. and maintaining the reactor temperature within said range for a fourth time interval ranging between 210 and 300 minutes.

5. The method according to the claim 3, wherein the initial pH value is within the range between 7.8 and 8.2.

6. The method according to the claim 3, wherein the PEG in the step (a) is PEG-1000.

7. The method according to the claim 3, wherein the esterification in the step (a) is performed with equimolar initial amounts of PEG and MA.

8. The method according to the claim 3, wherein the esterification in the step (a) is performed for 100 to 130 minutes and with the esterification reaction temperature within the range of 85 to 95° C.

9. The method according to claim 4, wherein the esterification in the step (a) is performed for 100 to 130 minutes and with the esterification reaction temperature within the range of 85 to 95° C.

10. The method according to the claim 3, wherein the total reactants content in the mixture of step (b) is between 10 to 20% w/w.

11. The method according to the claim 4, wherein the total reactants content in the mixture of step (b) is between 10 to 20% w/w.

12. The method according to the claim 3, wherein the mixture of step (b) initially comprises 23 to 28 moles of AA and 22 to 27 moles of AMPS per each mol of PEGMA.

13. The method according to the claim 4, wherein the mixture of step (b) initially comprises 23 to 28 moles of AA and 22 to 27 moles of AMPS per each mol of PEGMA.

14. The method according to the claim 3, wherein the initiator of step (b) comprises an inorganic peroxide selected from the group consisting of ammonium persulfate, hydroxymethanesulfinic acid monosodium salt dehydrate, potassium persulfate, sodium persulfate, and a mixture thereof.

15. The method according to the claim 3, wherein the initiator comprises potassium persulfate (KPS) having a mass concentration within the range 0.5% to 1.5% w/w with regard to the mass of the reactants in the mixture.

16. The method according to the claim 4, wherein the initiator comprises potassium persulfate (KPS) having a total mass concentration within the range 0.5% to 1.5% w/w with regard to the mass of the reactants in the mixture.

17. The method according to the claim 4, wherein the controlled addition of the initiator in at least one of step (d) and step (e) is performed throughout a time interval within the range between 4 and 8 minutes.

18. The method according to the claim 4, wherein the first time interval ranges between 28 and 32 minutes, the second time interval ranges between 47 and 52 minutes, the third time interval ranges between 70 and 80 minutes, and the fourth time interval ranges between 225 and 260 minutes.

19. The method according to the claim 3, wherein the removal of free oxygen is performed by sweeping with an inert gas.

* * * * *